United States Patent
Schumacher (10) Patent No.: US 6,837,626 B1
(45) Date of Patent: Jan. 4, 2005

(54) ELECTRO-OPTICAL CONNECTOR

(75) Inventor: Richard A. Schumacher, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/712,877

(22) Filed: Nov. 12, 2003

(51) Int. Cl.$^7$ .................................................. G02B 6/36
(52) U.S. Cl. ......................... 385/89; 385/88; 385/92; 385/53; 385/70; 385/71; 385/139
(58) Field of Search ........................ 385/14, 88, 89, 385/92, 94, 53, 55, 70, 71, 101, 139, 76, 77

(56) References Cited

U.S. PATENT DOCUMENTS

| | | | |
|---|---|---|---|
| 4,465,333 A | * | 8/1984 | Caserta et al. ............... 385/73 |
| 4,984,864 A | | 1/1991 | Blyler, Jr. et al. ......... 385/24 X |
| 5,034,944 A | | 7/1991 | Grimes et al. ................. 370/1 |
| 5,206,753 A | | 4/1993 | Grimes et al. ............... 359/128 |
| 5,212,578 A | | 5/1993 | Grimes et al. ............... 359/124 |
| 5,416,872 A | * | 5/1995 | Sizer et al. .................... 385/92 |
| 5,606,671 A | * | 2/1997 | Wadsworth et al. ........ 710/106 |
| 5,611,013 A | * | 3/1997 | Curzio .......................... 385/89 |
| 5,767,701 A | * | 6/1998 | Choy et al. ................... 326/93 |
| 5,789,944 A | * | 8/1998 | Choy et al. ................... 326/82 |
| 5,887,050 A | | 3/1999 | Fenske et al. ................. 379/4 |
| 6,402,393 B1 | | 6/2002 | Grimes et al. ................ 385/89 |
| 6,477,056 B1 | | 11/2002 | Edwards et al. ............ 361/752 |
| 6,477,286 B1 | | 11/2002 | Ouchi .......................... 385/14 |
| 6,567,963 B1 | * | 5/2003 | Trezza ............................ 716/8 |

* cited by examiner

*Primary Examiner*—Brian M. Healy (57) ABSTRACT

Example systems and methods related to an electro-optical connector are provided. In one example, an electro-optical connector includes an electrical port configured to communicate first and second electrical signals into and out of the electro-optical connector. An optical output port is provided in electrical communication with the electrical port, the optical output port configured to convert first electrical signals representing a first value into first optical signals representing the first value, and convert second electrical signals representing a second value into second optical signals representing the second value.

25 Claims, 6 Drawing Sheets

ELECTRO-OPTICAL CONNECTOR

BACKGROUND

As the computer environment continues to advance, the density of electrical circuitry, the number of electrical connectors necessary for high speed links, and the increasing drive for faster cycle times all contribute to losses which are becoming increasingly detrimental. Techniques are being tested to overcome some of the drawbacks now being observed such as using more exotic printed circuit board materials, employing various signal encoding techniques, and other electrically or architecture based solutions.

SUMMARY

In accordance with one embodiment, an electro-optical connector includes an electrical port configured to communicate electrical signals alternately into and out of the electro-optical connector. An optical input port in electrical communication with the electrical port is provided to convert received optical signals into electrical signals. An optical output port in electrical communication with the electrical port is provided to convert received electrical signals into optical signals. Logic is also provided to permit communication between the electrical port and a selected one of the optical input port and the optical output port.

BRIEF DESCRIPTION OF THE DRAWINGS

It will be appreciated that illustrated boundaries of elements (e.g. boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. It should be further appreciated that the figures are drawn to no scale and individual portions are illustrated enlarged or reduced for clarity in certain circumstances.

DETAILED DESCRIPTION OF ILLUSTRATED EMBODIMENTS

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), a programmable/programmed logic device, memory device containing instructions, or the like. Logic may also be fully embodied as software.

"Signal", as used herein, includes but is not limited to one or more electrical signals, optical signals, visible or infrared light or patterns thereof, analog or digital signals, one or more computer or processor instructions, messages, a bit or bit stream, or other means that can be received, transmitted, and/or detected.

Generally, in one embodiment, one or more full duplex opto-isolators are configured for optical communication across an optical path with other opto-isolators on separate assemblies. As will become apparent, the system permits both mechanical and electrical isolation between the assemblies including signal communication between otherwise incompatible electrical devices.

Figure 1:
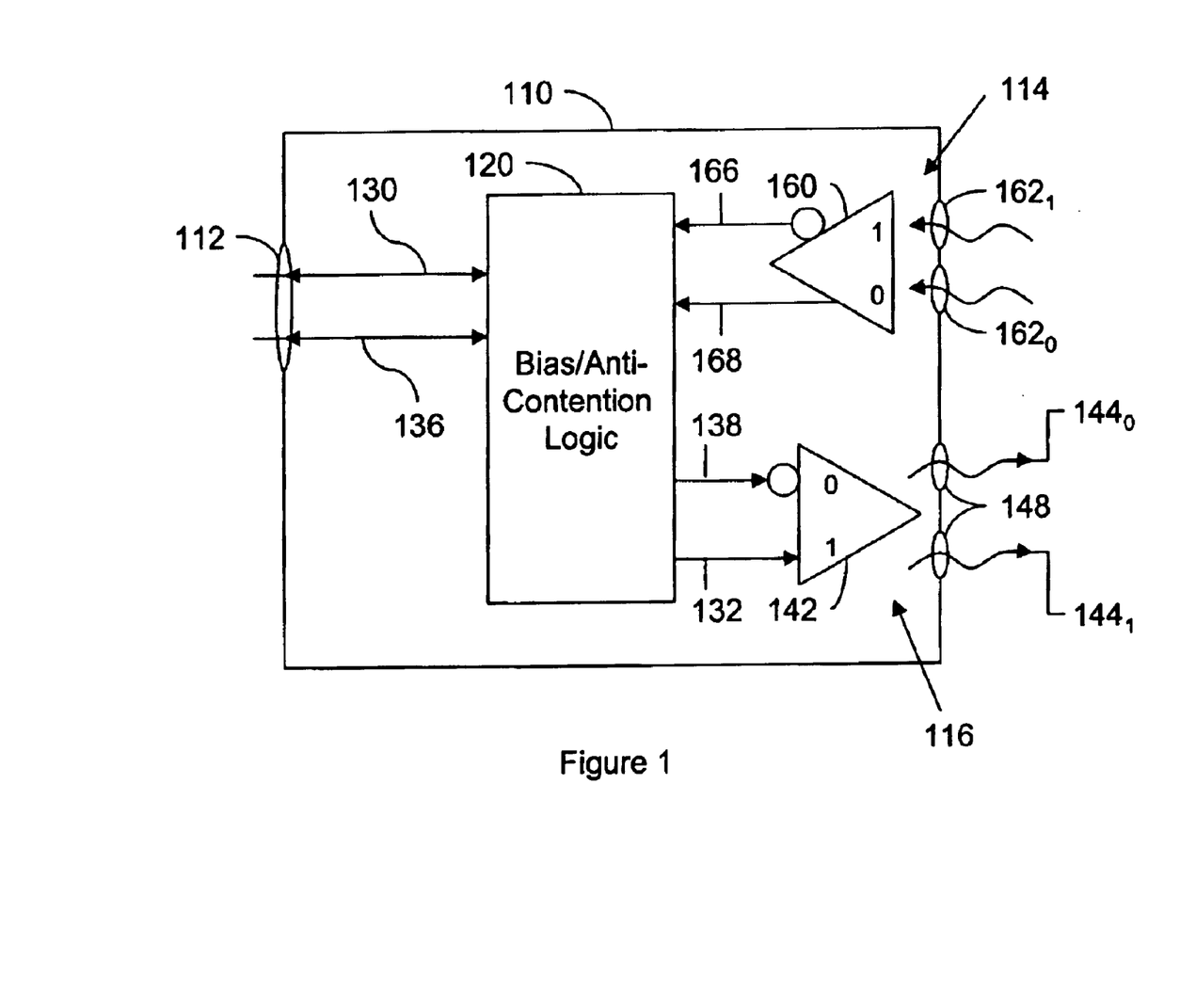
FIG. 1 is an example transceiver according to one embodiment.

With reference now to FIG. 1, an electro-optical connector or transceiver 110 can be configured as including a bidirectional, differential electrical port 112, an optical input port 114, and an optical output port 116. This embodiment may be described as half-duplex transceiver with differential electrical port, differential internal electricals, and un-coded optical ports. The illustrated embodiment also includes bias and anti-contention logic 120. Bias and anti-contention logic 120 is configured to prevent or reduce electrical signals within the transceiver from competing, canceling, or otherwise interfering with electrical signals from another portion of the transceiver 110, and to prevent the transceiver's electrical outputs from competing, canceling, or otherwise interfering with external electrical driver(s) connected to the electrical port. The bias aspect of the bias and anti-contention logic permits different electrical signaling levels on one side of the transceiver, for example the optical driver, and on another side of the transceiver. Bias and anti-contention logic 120 may also be configured to provide transmission line termination of external electrical drivers connected to the electrical port 112.

In the illustrated embodiment, transceiver 110 is configured as a bidirectional electro-optical device including differential electrical port 112. During operation, an outbound electrical signal is received at electrical port 112 from an assembly such as a printed circuit board or other device from which the electrical signal is to be transferred. As an example, a differential electrical signal representing a first value, e.g. a binary one, is received at the electrical port 112 and enters transceiver on lines 130 and 136. Bias/anti-contention logic 120 disables optical input port 114 from the electrical port 112 and directs the electrical signal to optical output port 116 on lines 132, 138. On receipt of the electrical signal on lines 132, 138, the optical output port 116 generates or emits an optical signal corresponding to the binary one of the provided electrical signal. Similarly, a second value representing a binary zero received on lines 130, 136 is provided to the optical output port 116 on lines 132, 138 for transmission from the emitter corresponding to the binary zero value. This embodiment minimizes electromagnetic interference (EMI) and maximizes electromagnetic compatibility (EMC) by virtue of its differential electrical port, the use of differential electrical signaling internal to the transceiver, and the use of complementary non-binary coded optical outputs (to maintain a more nearly constant power requirement). Other applications may exchange these EMI/EMC features for reduced cost of fabrication or smaller size by use of a single-ended electrical port, or single-ended electrical signaling internal to the transceiver, or a single binary coded optical output device, where, for example, an optical output equates to a binary one, and no optical output equates to binary zero.

In the illustrated embodiment, the optical output port 116 can include transmit logic 142 configured to generate identifiably distinct optical signals or radiation such as zero signal values $144_0$ and one signal values $144_1$ from corresponding applied electrical signals. The radiation or optical signals can emanate from complimentary radiation emitting devices 148 such as LEDs, and other optical signal producing devices including other semi-conductor devices. The optical output port 116 can be configured to include a balanced electrical driver stage with high gain at the switching point, for example CMOS totem pole, LVDS, LVPECL differential pair, and the like. The balanced driver and dual emitter construction of the output optical port 116 may reduce potential effects including device saturation and resultant increased latency when transmitting long strings of identical signal values, for example, long strings of either one or zero signal values.

The transceiver 110 can also be configured to receive incoming optical signals from, for example, a complimentary transceiver disposed on another assembly. The input optical port 114 can include receive logic 160 including a pair of balanced optical receivers 1620 and 162, such as phototransistors, photomultipliers, and other devices that convert received electromagnetic energy into inbound electrical signals. Upon receipt of an optical signal at, for example, receiver 1621, the receive logic 160 produces an electrical signal representative of a binary one and provides the differential electrical signal to the bias and anti-contention circuit on lines 166, 168. The bias and anti-contention logic 120 disables the optical output port 116 and provides the electrical signal to the electrical port 112 on lines 130, 136 for communication to the assembly on which the transceiver resides. In a like manner, an optical signal received on receiver 1620 is converted to an electrical signal representative of a binary zero and provided on lines 166, 168 to the bias and anti-contention logic 120. The produced electrical signal is provided, via lines 130, 136, to the electrical port 112 where the signal is transmitted out of the transceiver 110.

When the electrical port 112 is not receiving a valid binary one or zero signal, optical drivers may be optionally disabled to indicate availability to transit signals. The electrical port may be configured to provide proper transmission line termination. Moreover, each electrical port may be configured to accept one or several signaling levels or technologies now known or later developed such as ECL, CMOS, and the like, or like technologies operating at different voltages or signal levels.

Figure 2:
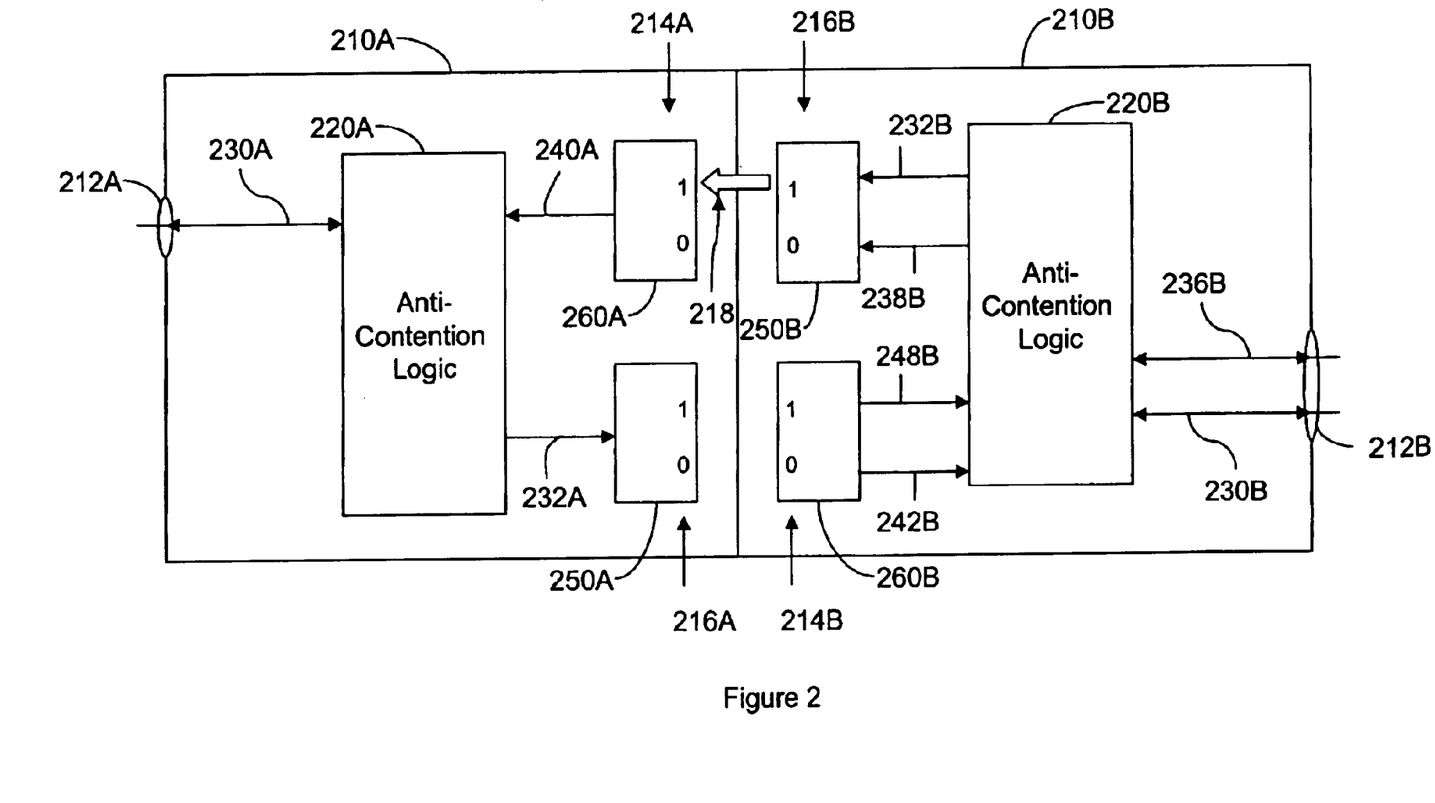
FIG. 2 is an illustration of an example connection achieved by two connectors in a mated configuration.

With reference now to FIG. 2, two transceivers are illustrated. For ease of distinction, like, but not necessarily identical components will be referenced with like numbers and the different suffixes "A" and "B." In one embodiment, a first transceiver 210A is configured for optical connection with a second transceiver 210B. For example, an optical input port 214A is provided for optical connection with an optical output port 216B from the second transceiver 210B over an optical path 218. Optical paths are also provided between optical input port 214B and optical output port 216A. While the transceivers are illustrated as connected, the optical path between the optical input port 214A and the optical output port 216B can include any optical medium such as vacuum, air or other gaseous interface, fiber optic cabling, and the like.

With continued reference to FIG. 2, another embodiment is illustrated including only anti-contention logic 220B that serves to selectively permit and inhibit electrical communication between the electrical port 212B and ones of the input optical port 214B and optical output port 216B. Bias or other electrical signal modifications can occur, if needed, off the transceiver 210B.

Continued reference to FIG. 2 reveals the ability for two electrically different systems to communicate. For example, electrical port 212A can include unbalanced electrical signals referenced, for example, to ground. Such signals can still be bi-directional, or may alternatively be only one-way. Regardless, when an input electrical signal enters the electrical port 212A, anti-contention logic 220A routes the binary signal from line 230A to the optical output port 216A on line 232A. Transmit logic 250A associated with the optical output port 216A is configured to convert the electrical signal to a corresponding optical signal and transmit the optical signal. As illustrated, the optical signal would be received by optical input port 214B, that is part of a bi-directional, differential system. Receive logic 260B is configured to convert the received optical signal into a differential electrical signal (in the illustrated embodiment) and route the electrical signal on lines 242B, 248B to anti-contention logic 220B. The differential electrical signal is then routed over lines 230B, 236B to the electrical port 212B and out of the transceiver 210B.

Similarly, an input electrical signal arriving at electrical port 212B is communicated to the anti-contention logic 220B over differential paths 230B and 236B. The anti-contention logic 220B disables the optical input port 214B and routes the signal over lines 232B, 238B to the differential optical output port 216B. Transmit logic 250B is configured to convert the electrical signal into optical form and transmit the optical signal from transceiver 2103 over optical path 218. As illustrated, the optical signal is received by optical input port 214A. Receive logic 260A is configured to convert the received optical signal into an electrical signal and route the electrical signal on line 240A to anti-contention logic 220A. The electrical signal is then routed over line 230A to the electrical port 212A and out of the transceiver 210A.

Figure 3A:
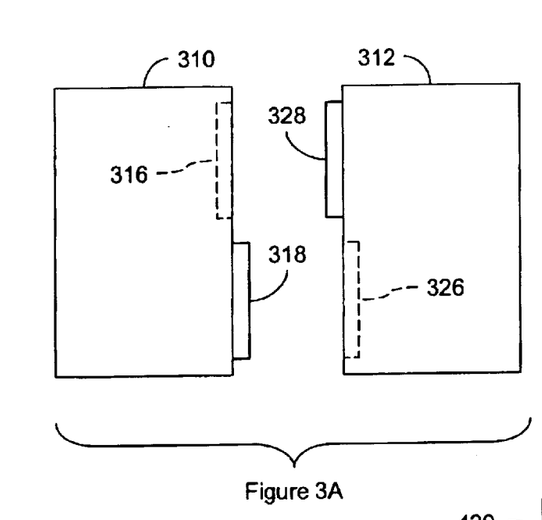
FIG. 3A illustrates another embodiment of connectors.

With reference now t FIG. 3A, a set of electro-optical connectors 310, 312 are illustrated in optical communication with each other. For example, the connector 310 includes an optical input port 316 configured in an optically aligned relationship with optical output port 328 on adjacent connector 312. In a similar arrangement effected by the symmetrical construction of the connector bodies 310, 312, optical input port 326 is optically aligned with optical output port 318. While the connectors are illustrated in a slightly spaced configuration, with the illustrated embodiment, the connectors can be configured to be in a communicable distance to each other rather than in physical contact. Of course, the input and output ports can be in physical contact. For example, optical input port 316 can be disposed in a recessed fashion in the connector body 310, while optical output port 328 is complementarily disposed in a protruding fashion on connector body 312. As illustrated, the adjacent ports are properly aligned using an orientation mechanism associated with the connectors 310, 312 including complimentary shaped features. In addition to providing mechanical stability to the connection, this male/female configuration also enhances optical isolation between adjacent ports. Moreover, physically distinct optical ports help reduce inadvertent alignment of, for example, output port to output port.

Figure 3B:
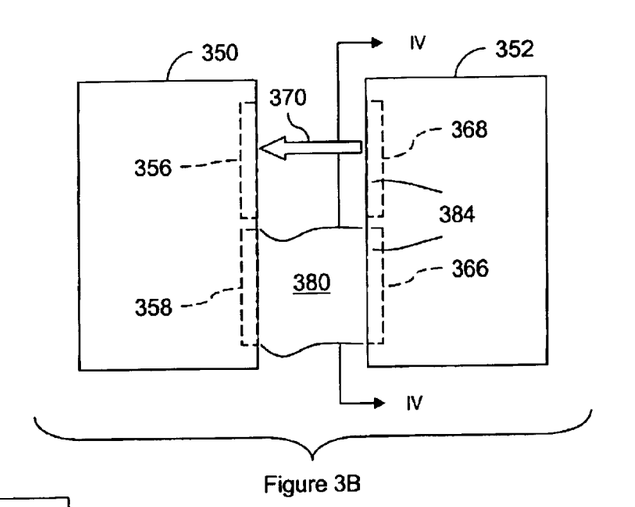
FIG. 3B illustrates another embodiment and alternate optical paths.

Referring now to FIG. 3B, yet another example includes both optical input ports 356, 366 and optical output ports 358, 368 in a recessed configuration. In a first arrangement, an optical path 370 is achieved by aligning the optical input port 356 of one connector 350, with the optical output port 368 of another connector 352. As better illustrated in FIG. 4 and more fully discussed below, the frame of the connectors surrounding the recessed ports provide additional optical isolation from competing or stray optical signals.

In a second arrangement illustrated by FIG. 3B, an optical path can be provided with optical fiber, light pipe, or other optical conductor 380. As illustrated, the conductor 380 can be configured to be seated or otherwise fit into recesses 384. Depending on a variety of factors, the conductor 380 can provide the optical path, for example, when the connectors 350, 352 are spaced too distantly to permit reliable optical communication, or when environmental or other factors are expected to reduce or prevent optical communication. The conductor 380 also can provide the optical path in still other situations, such as where the optical ports cannot be aligned with each other.

Figure 4:
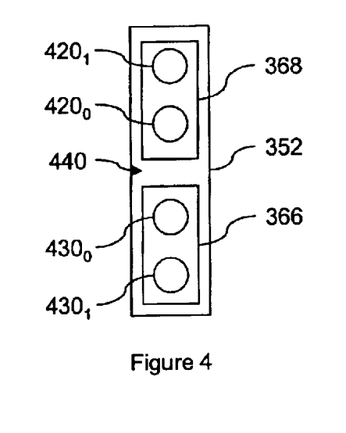
FIG. 4 illustrates a front elevational view of FIG. 3B taken along line IV—IV.

Referring now to FIG. 4, a front view of the connector 352 is shown taken along line IV—IV. In one embodiment, the optical output port 368 includes two light emitting devices $420_0$ and $420_1$ recessed in the connector 352. One light emitting device $420_1$ can be configured to produce an optical signal corresponding to a binary value of one. The second light emitting device $420_0$ can be configured to produce an optical signal corresponding to a binary value of zero. In this configuration, light can be transmitted from the optical output port 368 continuously during a transmit operation. The optical input port 366 can contain two optical receivers $430_0$ and $430_1$. The optical receiver $430_0$ is configured to detect signals corresponding to a binary zero value while the optical receiver $430_1$ is configured to detect signals corresponding to a binary one value. It is appreciated that active optical signals for transmission and reception corresponding to both binary values assists to confirm the presence of a valid optical path. In other words, any ambiguity introduced by lack of optical signal as representing a long string of binary zero, for example, or alternatively, that a lack of optical signal represents a degraded or broken optical path, is resolved. Further, the optical input port 366 can be optically isolated from the optical output port 368 by a frame 440 or other occluding device between the ports 366 and 368 like a baffle. In another embodiment, light can be transmitted non-continuously, for example, in a certain maximum duration. This would reduce the total power required by the transmitting connector, which could be significant in some applications.

Figure 5:
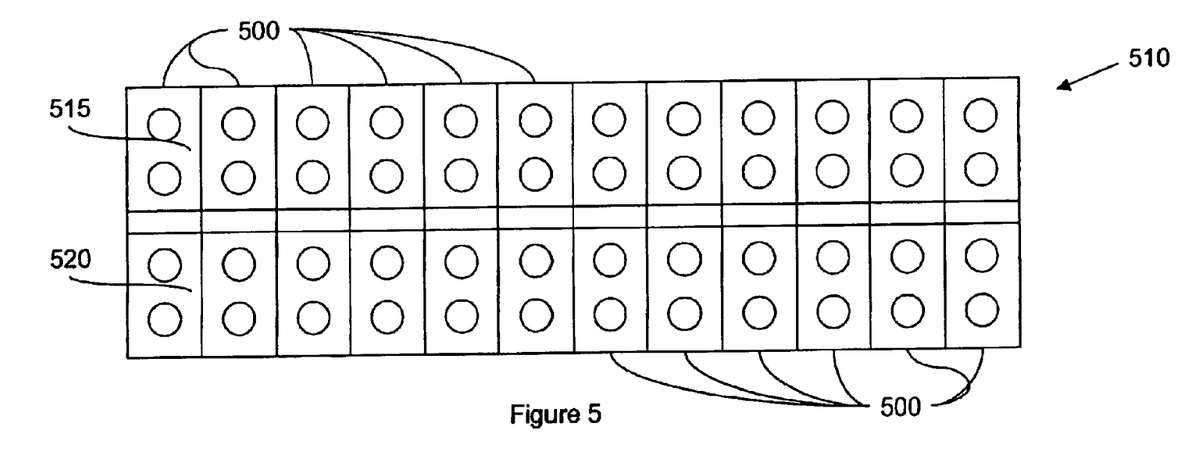
FIG. 5 illustrates an example embodiment of a plurality of transceivers assembled in a connector.

With reference now to FIG. 5, a plurality of transceivers 500 may be arranged or grouped within a connector body 510. Such grouping may supply a parallel configuration or otherwise maximize optical connection or transfer speeds. As previously described, each transceiver 500 can include an optical output port 515 and an optical input port 520. In one configuration, the optical ports 515, 520 can be arranged in any desirable fashion such as positioning the optical output ports 515 side-by-side in a linear relationship across the connector body 510 or alternating between an input port 520 and an output port 515 across the connector body 510. Of course, other physical arrangements are possible for particular applications.

Figure 6:
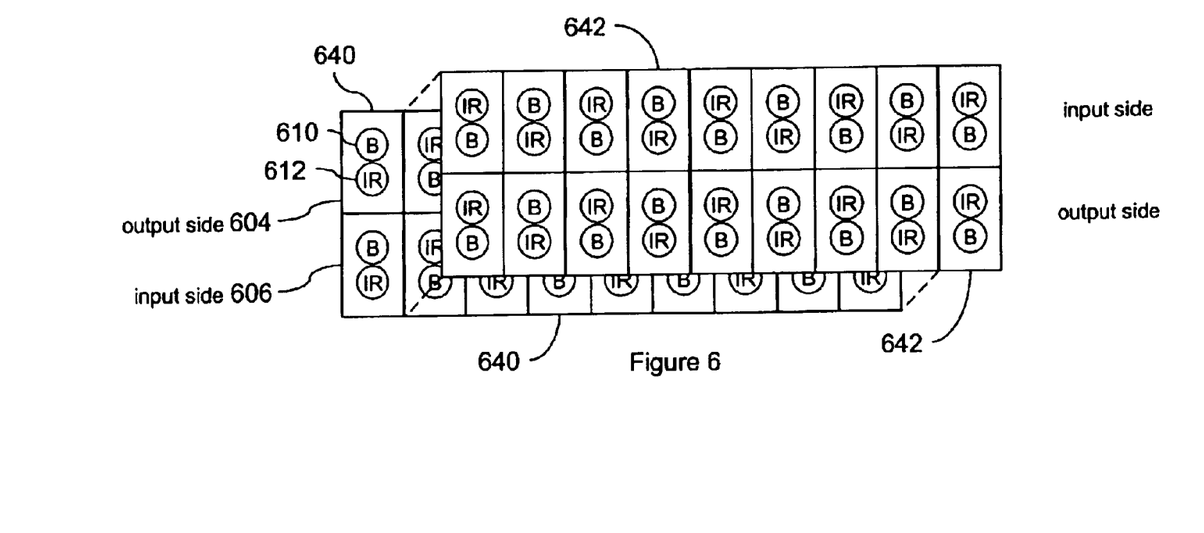
FIG. 6 illustrates another embodiment of a plurality of transceivers assembled in a connector.

Referring now to FIG. 6, another embodiment of an optical connector is shown. For example, optical isolation can be enhanced by employing optical output devices and optical input devices having different, identifiable, characteristics such as wavelength. In the illustrated example, a first plurality of transceivers 602 includes an output side 604 and an input side 606. The output side 604 includes two transmitters 610, 612 capable of transmitting optical signals having different, identifiable, signal characteristics such as wavelength. For example, the transmitter 610 can be configured to transmit blue light indicated by "B," and the transmitter 612 can be configured to transmit infrared light indicated by "IR." Use of detectably different wavelengths can permit closer arrangement of both transmitters and receivers due to the lower likelihood of optical interference, cross-talk, and the like.

With further reference to FIG. 6, in one embodiment, the connectors 640 and 642 can be configured with alternating characteristics of the optical output devices and optical input devices that can be oriented in any desired pattern. In the illustrated example, on the output side 604, the top transmitter 610 alternates in adjacent transceivers between blue and infra-red (denoted by the letter "B" for blue and "IR" for infra-red), while the lower transmitter 612 is oppositely configured. In a similar fashion, on the input side 606, the top receiver 620 alternates between one of the expected characteristics to be received and the other, here between blue and infra-red. In situations such as that illustrated, where matching connectors 640, 642 include positioning one connector in a first configuration (e.g. right-side-up) and positioning the other connector in a second configuration (e.g. upside-down) achieving proper alignment between cooperative transmitters and receivers necessitates offsetting the plurality of connectors or otherwise properly establishing an optical path. Such configurations can include physically distinguishable indicia such as that discussed previously to assist in assembling aligned optical ports.

Figure 7:
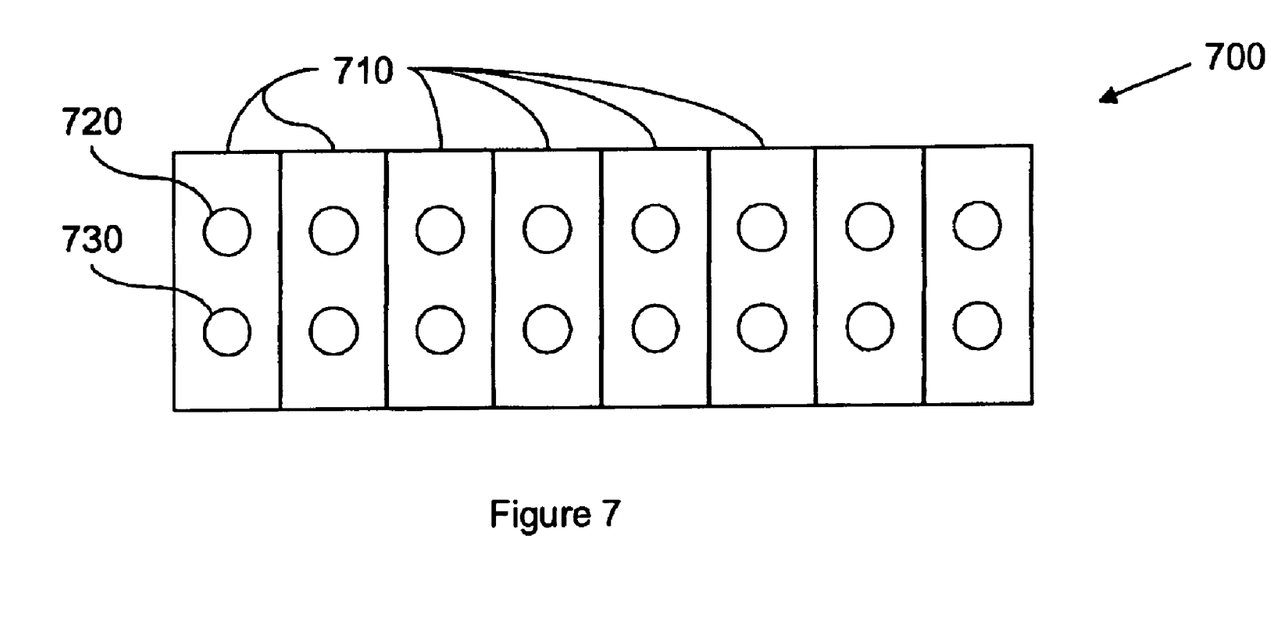
FIG. 7 illustrates another example embodiment of a plurality of transceivers assembled in a connector.

Referring now to FIG. 7, another example of an arrangement 700 of a plurality of transceivers 710 is illustrated. Each transceiver in the illustration comprises a single emitter 720 and a single receiver 730. In one embodiment, logic controlling the single emitter can be configured to emit an optical signal in the presence of, for example, a binary one value. Under other circumstances, no optical signal would be emitted, or any signal generated would be ignored. In another embodiment, the emitter is configured as a multi-color LED or other multicolor polymer diodes and the receiver is configured to discriminate between more than one received frequency of an optical transmission. For example, a frequency corresponding to the color "green" could be associated with a binary value of one, while a frequency corresponding to the color "rod" could be associated with a binary value of zero.

Figure 8:
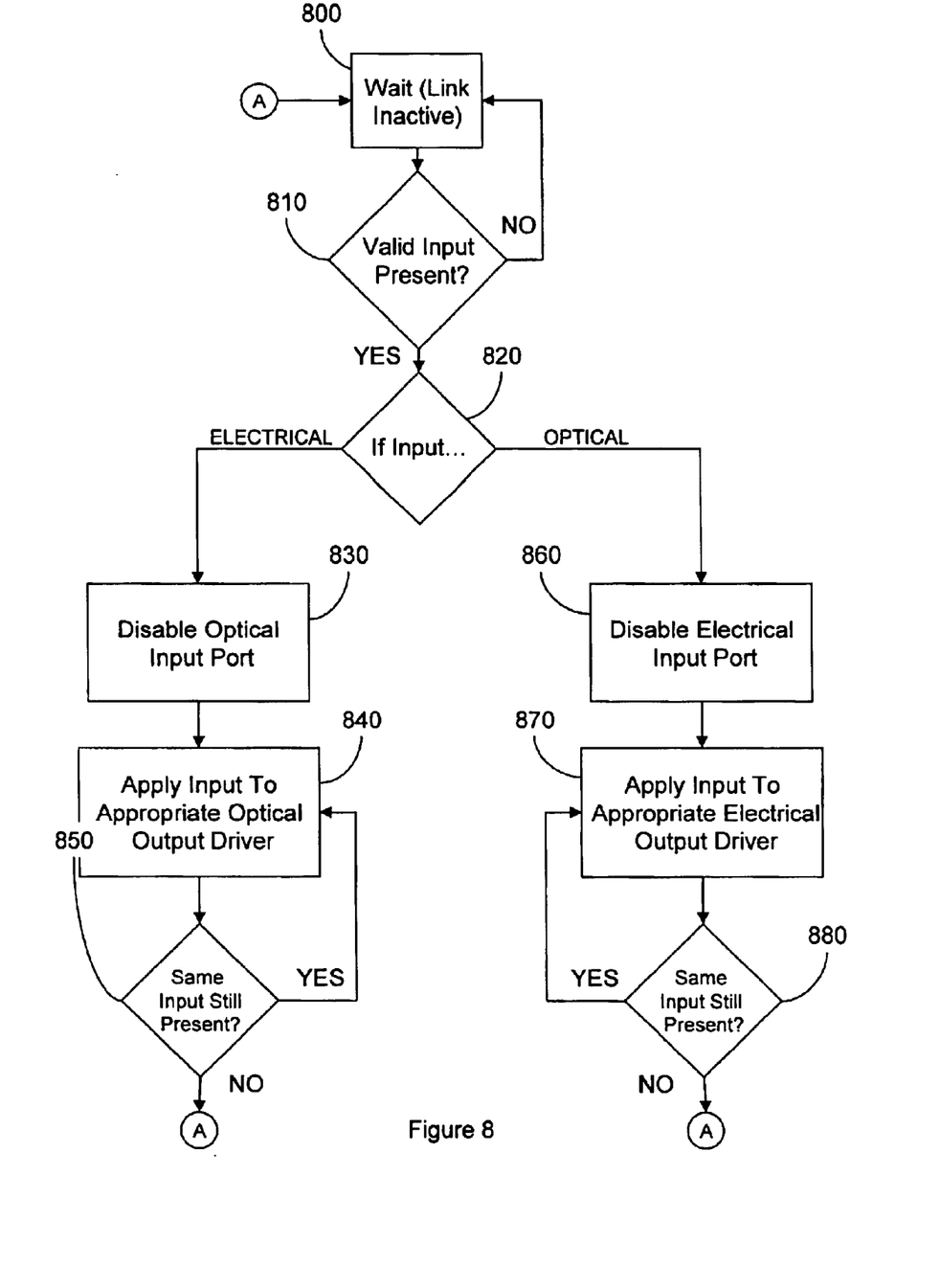
FIG. 8 illustrates a flow diagram of a method according to one embodiment

Referring now to FIG. 8, one embodiment of a methodology, or algorithm is illustrated. In an idle condition, the system loops while the link is inactive (block 800) awaiting a valid input (block 810). Upon receipt of a valid input, the algorithm branches depending on characteristics of the input (block 820). As shown, if the input is electrical, the algorithm presents high impedance or otherwise disables an optical input port (block 830). The electrical input signal is converted to an appropriate optical output (block 840). If the input remains, the algorithm loops until the electrical signal is no longer applied (block 850). If the input is optical at block 820, the algorithm presents high impedance or otherwise disables an electrical input port (block 860). The optical input signal is converted to an appropriate electrical output (block 870). If the input remains, the algorithm loops until the optical signal is no longer applied (block 880) applying the input to the appropriate driver. It is now to be appreciated that the high impedance can be applied at various locations in the method. For example, in one embodiment different optical components use a common electrical pathway. In another embodiment different electrical pathways converge on a common optical component. In yet other embodiments, dedicated optical components use dedicated electrical pathways. In such dedicated systems, there may be reduced or no need for a high impedance state to be presented. It is also to be understood that an embodiment permits signal communication between devices having similar electrical characteristics as well as devices having different electrical characteristics.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, alternate embodiments including full duplex, half duplex, and simplex electrical ports, are achievable without departing from the spirit or scope of the applicant's general inventive concept. Differential and single-ended electrical ports, and electrical internals may be substituted without departing from the spirit or scope of the applicant's general inventive concept. Moreover, the concepts disclosed here are applicable to both coded and un-coded optical ports. Therefore, the invention, in its broader aspects, is not limited to the specific details, the representative apparatus, and illustrative examples shown and described. Accordingly, departures may be made from such details while capturing the spirit and scope of the applicant's general inventive concept

I claim:

1. An electro-optical connector comprising:
   an electrical port configured to communicate first and second electrical signals into and out of the electro-optical connector;
   an optical output port in electrical communication with the electrical port, the optical output port configured to convert the first electrical signals representing a first value of a binary one into first optical signals representing the first value, and convert the second electrical signals representing a second value of a binary zero into second optical signals representing the second value;
   a first emitter connected to the optical output port and being configured to emit the first optical signals; and
   a second emitter connected to the optical output port and being configured to emit the second optical signals.

2. The electro-optical connector as set forth in claim 1, further comprising:
   an optical input port in electrical communication with the electrical port, the optical input port configured to convert first optical signals representing a first value into first electrical signals representing the first value, and convert second optical signals representing a second value into second electrical signals representing the second value; and
   logic configured to permit communication between the electrical port and a selected one of the optical input port and the optical output port.

3. The electro-optical connector as set forth in claim 2, where the optical input port comprises:
   at least one receiver configured to receive a first optical signal representing a first value and to receive a second optical signal representing a second value; and
   receive logic configured to convert received first and second optical signals into corresponding first and second electrical signals.

4. The electro-optical connector as set forth in claim 3, where the receive logic comprises a phototransistor.

5. The electro-optical connector as set forth in claim 1, where the optical output port comprises:
   transmit logic configured to convert the first and second electrical signals into corresponding first and second identifiably distinct optical signals; and
   where the first emitter and the second emitter are configured to emit the first and second identifiably distinct optical signals, respectively.

6. The electro-optical connector as set forth in claim 5, where
   the first emitter being configured to emit the first identifiably distinct optical signals having a first wavelength; and
   the second emitter being configured to emit the second identifiably distinct optical signals having a second wavelength distinct from the first wavelength.

7. The electro-optical connector as set forth in claim 1, where the first optical signals comprise a first wavelength and the second optical signals comprise a second wavelength.

8. In a system including at least first and second logic assemblies not in electrical data communication with each other, a connector associated with a first logic assembly comprising:
   a connector body mountable to the first logic assembly; and
   a transceiver supported by the connector body, the transceiver including:
      an electrical path configured to communicate electrical signals to and from the connector to an electrical path on the first logic assembly, and
      an optical transmitter configured to selectively transmit one of a first active optical signal representing binary one values derived from an electrical signal and a second active optical signal representing binary zero values derived from the electrical signal where the first and second active optical signals are transmitted by separate transmitters, the transmission directed to a connector on the second logic assembly to establish data communication between the first and second logic assemblies.

9. The connector as set forth in claim 8, where the transceiver further comprises:
   an electro-optical receiver configured to receive identifiably distinct optical signals from an adjacent optical transmitter from the connector on the second logic assembly, and convert the received distinct optical signals into a corresponding one of first electrical signals and second electrical signals.

10. The connector as set forth in claim 9, where the electrical path is configured for changeable electrical signal communication to one of the optical transmitter and the electro-optical receiver.

11. The connector as set forth in claim 8, where the separate transmitters comprise:
    a first transmitter configured to transmit the first active optical signal; and a second transmitter configured to transmit the second active optical signal.

12. The connector as set forth in claim 8, where the optical transmitter comprises:
   a transmitter configured to selectively transmit the first active optical signal having first identifiable characteristics and the second active optical signal having second identifiable characteristics.

13. The connector as set forth in claim 12, where the identifiable characteristics comprise wavelength.

14. The connector as set forth in claim 8, where the optical transmitter comprises a light emitting diode.

15. The connector as set forth in claim 9, where the electro-optical receiver comprises:
   a first photo-transistor configured to convert first optical signals into first electrical signals; and
   a second photo-transistor configured to convert second optical signals into second electrical signals.

16. The connector as set forth in claim 9, where the electro-optical receiver comprises:
   a photo-transistor configured to convert received optical signals having a first wavelength into first electrical signals and to convert received optical signals having a second wavelength into second electrical signals.

17. The connector as set forth in claim 8, further comprising:
   an orientation mechanism associated with the optical transmitter and configured to establish an optical signal path from the optical transmitter to an electro-optical receiver disposed on the second logic assembly.

18. An apparatus for transferring signals between assemblies in a computer system; the apparatus comprising on a first assembly:
   a first optical transmitter configured to transmit an optical signal in response to receipt of a first electrical signal representing a binary value, where the first optical transmitter is configured for optical communication with a corresponding optical receiver disposed on a second assembly;
   a second optical transmitter configured to transmit an optical signal in response to receipt of a second electrical signal representing a different binary value, where the second optical transmitter is configured for optical communication with a corresponding optical receiver disposed on the second assembly;
   a first optical receiver optically isolated from the transmitters, the first optical receiver configured to receive an optical signal representing the binary value from a corresponding optical transmitter disposed on the second assembly and convert the received optical signal into an electrical signal representation of the binary value; and
   a second optical receiver optically isolated from the transmitters, the second optical receiver configured to receive an optical signal representing the different binary value from a corresponding optical transmitter disposed on the second assembly and convert the received optical signal into an electrical signal representation of the different binary value.

19. The apparatus as set forth in claim 18, further comprising:
   an electrical port in electrical communication with the first assembly; and
   anti-contention means for preventing the electrical port from attempting to drive an electrical signal when another electrical signal is present at the electrical port.

20. A method comprising:
   converting outbound electrical signals communicated into an electro-optical connector into optical signals that are separated by binary value and optically communicating the optical signals from the electro-optical connector using separate optical transmitters based on binary value of the optical signals;
   converting optical signals communicated into the electro-optical connector into inbound electrical signals and electrically communicating the inbound electrical signals from the electro-optical connector; and
   permitting a selected one of either the converting outbound electrical signals or the converting optical signals at a time.

21. A method comprising:
   converting outbound electrical signals communicated into an electro-optical connector into optical signals and optically communicating the optical signals from the electro-optical connector;
   converting optical signals communicated into the electro-optical connector into inbound electrical signals and electrically communicating the inbound electrical signals from the electro-optical connector; and
   permitting a selected one of either the converting outbound electrical signals or the converting optical signals at a time by presenting high impedance between an electrical port and one of an optical input port and an optical output port when an electrical signal is present between the electrical port and the other of the optical input port and the optical output port.

22. A system for connecting a first logic device with a second logic device where the first logic device communicates using a first electrical signal and the second logic device communicates using a second electrical signal that has different electrical properties than the first electrical signal, the system comprising:
   a first electro-optical connector connected to the first logic device and being configured to convert the first electrical signal into optical signals, the first electro-optical connector including:
      an optical output port configured to transmit the optical signals using a first emitter to transmit signals representing binary one values from the optical signals and using a second emitter to transmit signals representing binary zero values from the optical signals; and
   a second electro-optical connector connected to the second logic device and being configured to convert received optical signals into the second electrical signal, the second electro-optical connector including:
      an optical input port being configured to receive the optical signals from the optical output port using a first detector to detect the binary one values and using a second detector to detect the binary zero values, the second electrical signal being formed from a combination of the binary one values and the binary zero values.

23. The system of claim 22,
   the second electro-optical connector further including an optical output port configured to transmit optical signals from the second logic device to the first logic device; and
   the first electro-optical connector further including an optical input port for receiving the optical signals transmitted from the second logic device.

24. The system of claim 23, the first electro-optical connector including an anti-contention logic configured to selectively disable the optical input port or the optical output port.

25. The system of claim 22, the optical input port of the optical input port of the second logic device being mounted adjacent to the optical output port of the first logic device to establish optical communication therebetween.

* * * * *

UNITED STATES PATENT AND TRADEMARK OFFICE
CERTIFICATE OF CORRECTION

| | |
|---|---|
| PATENT NO. | : 6,837,626 B1 |
| APPLICATION NO. | : 10/712877 |
| DATED | : January 4, 2005 |
| INVENTOR(S) | : Richard A. Schumacher |

Page 1 of 1

It is certified that error appears in the above-identified patent and that said Letters Patent is hereby corrected as shown below:

IN THE SPECIFICATION

Column 2, line 43, after "logic" insert --120--

Column 3, line 34, delete "1620" and insert therefor --$162_0$--

Column 3, line 34, delete "162," and insert therefor --$162_1$--

Column 3, line 38, delete "1621," and insert therefor --$162_1$--

Column 3, line 46, delete "1620" and insert therefor --$162_0$--

Column 4, line 43, delete "2103" and insert therefor --210B--

Column 4, line 51, delete "t" and insert therefor --to--

Column 6, line 55, delete "rod" and insert therefor --red--

Signed and Sealed this

Twenty-sixth Day of June, 2007

JON W. DUDAS
*Director of the United States Patent and Trademark Office*